May 11, 1954  B. G. GALLASCH  2,677,987
MICROSCOPE STAGE MOVING MECHANISM
Filed Nov. 22, 1950  2 Sheets-Sheet 1

INVENTOR.
BERNHARDT GEORGE GALLASCH
BY
ATTORNEY

May 11, 1954     B. G. GALLASCH     2,677,987
MICROSCOPE STAGE MOVING MECHANISM
Filed Nov. 22, 1950     2 Sheets-Sheet 2
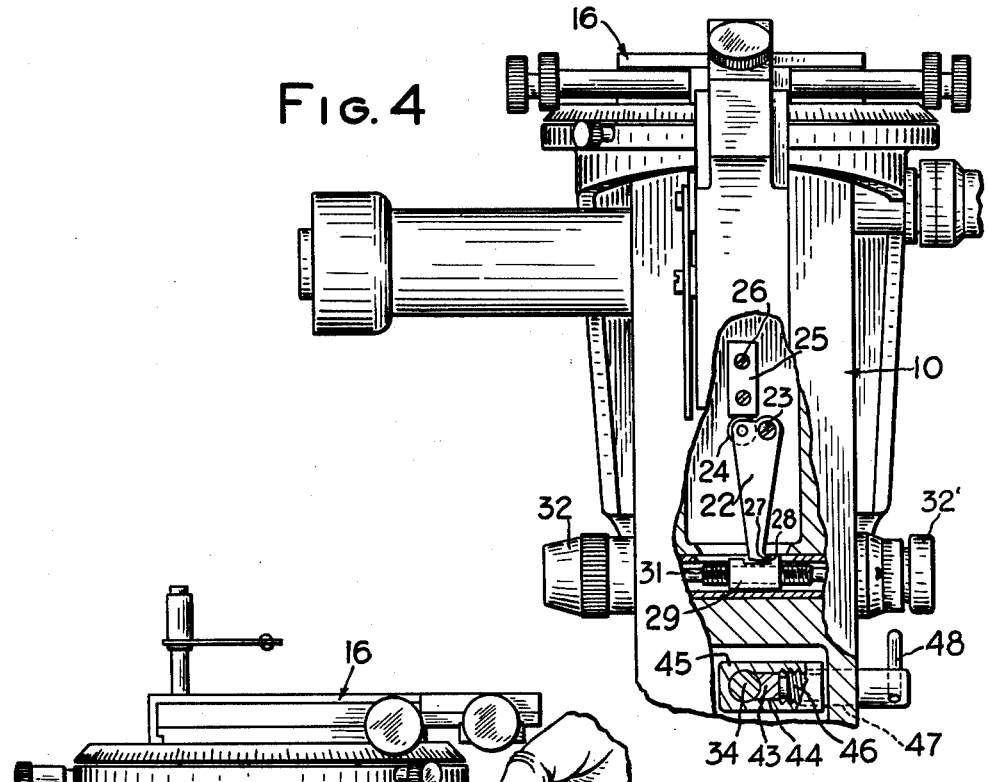
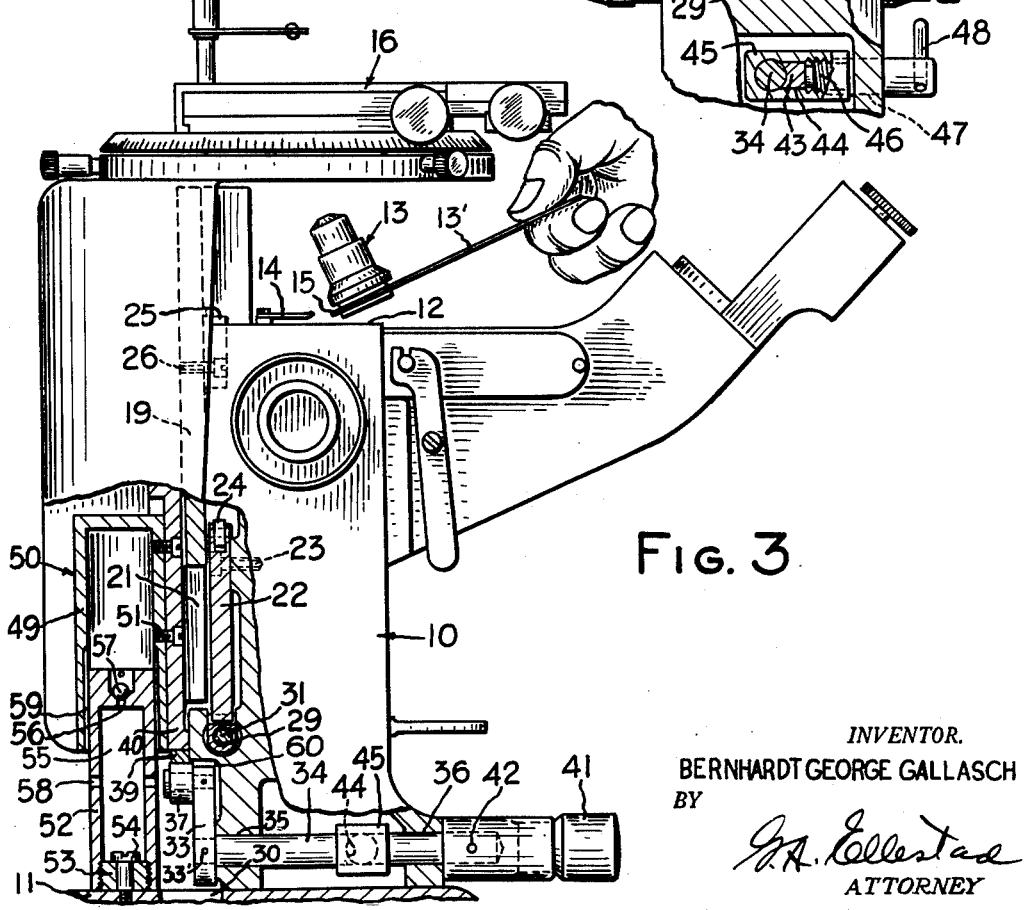
INVENTOR.
BERNHARDT GEORGE GALLASCH
BY
*G. H. Ellestad*
ATTORNEY Patented May 11, 1954

2,677,987

UNITED STATES PATENT OFFICE 2,677,987

MICROSCOPE STAGE MOVING MECHANISM

Bernhardt George Gallasch, Rochester, N. Y., assignor to Bausch & Lomb Optical Company, Rochester, N. Y., a corporation of New York Application November 22, 1950, Serial No. 196,990

2 Claims. (Cl. 88—39)

This invention relates to microscopes and more particularly it relates to improvements in microscopes of the so-called inverted type wherein the specimen is carried above the objective lens on a stage which is moved vertically to bring the specimen into focus.

Microscopes of this type which are usually used to examine metallographic specimens conventionally employ a vertically movable stage having an extended travel so that it may be raised to a sufficient height to permit interchanging of the stationary objective lens which is positioned beneath it. Customarily, the mechanism for elevating the stage consists of a rack and pinion connection between the microscope stand and the stage. In routine examination of great quantities of polished metal specimens, and the like, it is essential that the time required to perform all of the operations incident to the examination be as short as possible, and the aforesaid rack and pinion mechanism fails to fulfill this requirement. In the course of routine examination of test specimens, for instance, the time-consuming and fatiguing effects of moving a stage up and down repeatedly by a rack and pinion device become very apparent and prove to be a serious disadvantage in attaining maximum production.

In view of the above-mentioned considerations, it is an object of this invention to provide a novel mechanism for elevating and lowering the stage of such a microscope so that such operations are greatly accelerated.

Another object is to provide such a device in which the descent of the stage from its upper position is cushioned to reduce the impact as the stage reaches its lower position.

A further object is to provide such a device in which the elevating mechanism for the stage may be locked in any position of elevation.

It is a further object to provide such a device which is simple and rugged in construction and easy and reliable to use and maintain.

Figure 1:
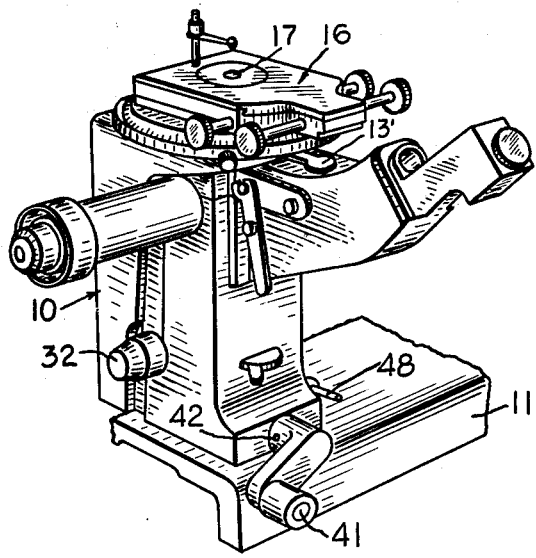
Figure 2:
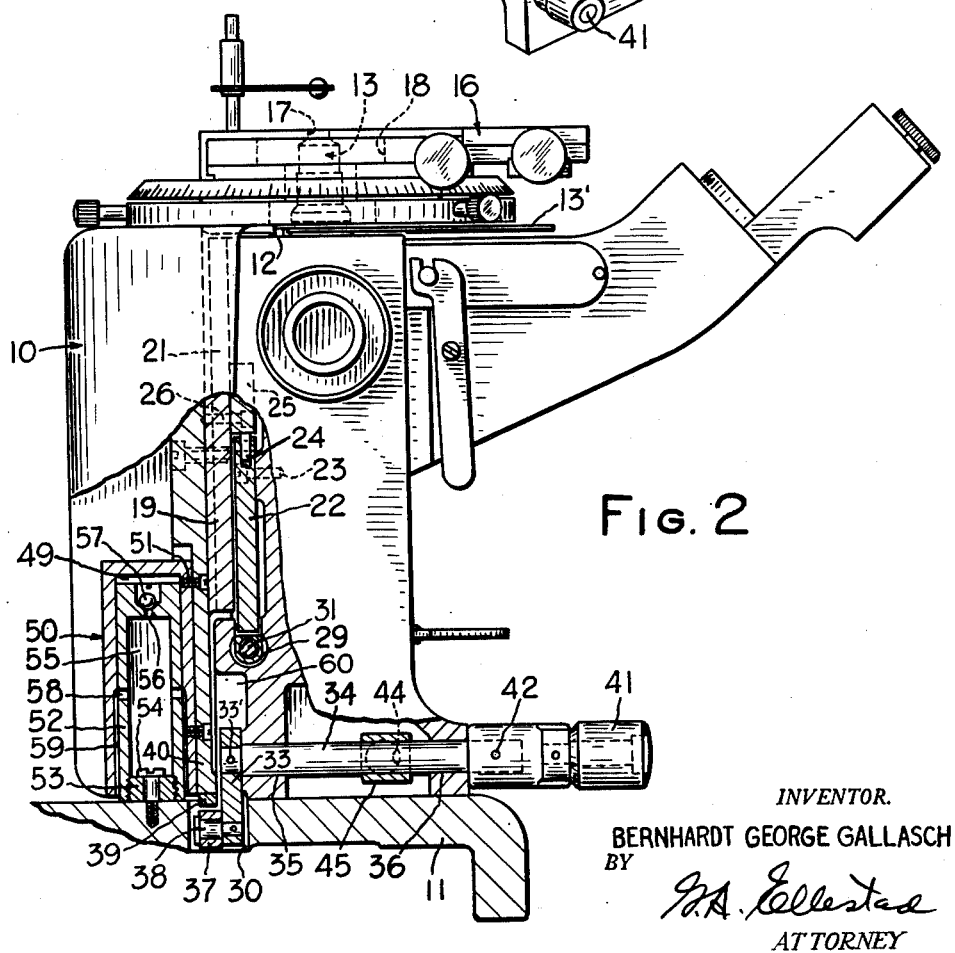

Further objects and advantages will be found in the novel details of construction and arrangement and combination of parts by referring to the following specification and accompanying drawing in which, Fig. 1 is a general perspective view of a metallographic microscope incorporating one form of my invention, Fig. 2 is a side view of the microscope, drawn at a larger scale, with the parts thereof in position for examining a specimen, some of the parts of the microscope being broken away and shown in section, Fig. 3 is a view similar to Fig. 2 of the microscope with its stage in its upper position for changing the objective, and Fig. 4 is a view of the microscope from the operator's side, with the parts in the same position as in Fig. 2 and certain parts being broken away to show internal structure.

In the drawings there is shown a metallographic type of microscope having a stand 10 attached to a suitable base 11. On the stand 10, there is provided a top surface 12 on which an objective lens 13 is secured in an upright position in alignment with the optical system (not shown) of the microscope. The objective 13 is held in proper position on the stand 10 by spring clips 14 which are fixed to the stand so as to engage the upper side of a radial flange 15 on the objective. Over and around objective 13 is positioned a stage 16 for supporting a specimen for examination with a surface of the specimen visible through an opening 17 so that it may be viewed by said optical system. Communicating with the opening 17, is an enlarged recess 18, Fig. 2, formed in the stage 16 to accommodate the objective 13 which is completely hidden from view and inaccessible when the stage is in operating position.

In order to render the objective 13 accessible for removal, the stage 16 is slidably mounted on the stand 10 so that it may be raised high enough to clear the objective. For this purpose, a vertical slide 19 is formed on the stage 16 extending downwardly into a fitted slideway 21 on the stand 10. In its lower or operating position, the weight of the stage 16 is borne by a fine adjustment mechanism comprising a lever member 22 which is fulcrumed on a pivot screw 23 threaded into the stand 10. The short arm of the lever 22 carries a roller 24 on which rests the abutment block 25 which is secured to the slide 19 in any preferred manner such as the screws 26. The long arm of lever 22 carries a pointed projection 27 which engages against a vertical shoulder 28 formed on a nut 29. By threading nut 29 onto a finely threaded shaft 31, which is rotatably held in the stand 10, the lever 22 may be moved angularly. Said shaft 31 is extended at either end beyond the stand 10 and carries knobs 32 and 32' so that fine adjustments of the vertical position of the stage 16 may be made by rotating the knobs.

According to this invention, there is provided for the purpose of raising and lowering the stage, a mechanism comprising an arm 33 which preferably is fixed by pin 33' on a crankshaft 34 journaled at 35 and 36 in the stand 10 so that the arm may be swung in an arc of approximately 180 degrees. The free end of arm 33 is provided with a roller 37 that is held on the arm by a headed axle pin 38 suitably fixed in the arm. A clearance recess 30 is provided in the base 11 to accommodate the arm 33 when in lower position. A contact block 39 is attached to the bottom of a slide extension 40 for contact with the roller 37, said block being of suitable hardness for long wearing qualities. Crankshaft 34 is extended through the front of the stand 10 so that a hand crank 41 may be fixed thereon by suitable means such as a shear pin 42 so as to turn the crankshaft.

Brake means are provided on crankshaft 34 for locking the stage 16 at any desired elevation. Said means comprise a brake shoe 43, Fig. 4, slidably held in a bore 44 which is formed in a brake block 45. The block 45 is bored to fit on crankshaft 34 and extend at right angles thereto, and the opening behind shoe 43 is threaded to receive a manually-operated screw 46 which is adapted to apply braking force to said shoe. The shank of screw 46 extends through an opening 47 in the stand 10 so that the block 45 is held stationary and the outer end of said screw is provided with a handle 48 for turning it.

Since the stage may be lowered rapidly with this mechanism, it is necessary that there be provided a retarding mechanism for cushioning the downward motion of the stage before the abutment block 25 strikes the fine adjustment lever 22. Such a mechanism is provided by the dashpot 50 which includes a cylinder 49 attached by screws 51 to the slide extension 40, and a piston 52 fitting the cylinder so as to form a dashpot, said piston being secured to the base 11 by a plug 53 threaded into the base of the piston and a screw 54, extending through an opening in the plug 53, and threaded into the base 11. The piston 52 is hollowed to provide an inner recess 55 which is in communication with the interior of cylinder 49 by means of the passageway 56 which contains a uni-directional air valve 57. The inner recess 55 is in communication with the outside air through the aperture 58 in the wall of piston 52 and the recess 59 formed on the inner surface of the lower end of cylinder 49, as shown in Fig. 2. As the stage 16 is raised, the cylinder 49 moves upwardly and thereby draws air into the cylinder by way of recess 59, apertures 58 and 56 and valve 57. On the downward movement of the stage and cylinder, air is trapped within the cylinder because of the closing of valve 57. However, the operating clearance between the walls of piston 52 and cylinder 49 is sufficient to permit seepage of air out of the cylinder on the down stroke so as to provide a satisfactory dashpot action. It is understood that various types of bleed valves may also be used in either the piston or cylinder for controlling the rate of descent of the stage 16.

In the operation of the microscope, the objective 13 is rendered accessible for interchange by turning the hand crank 41 clockwise a half turn to the position shown in Fig. 3 whereupon the crankshaft 34 and arm 33 are turned to move the slide extension 40 and stage 16 upwardly. The arm travels past its vertical position a few degrees as limited by the sidewall of the recess 60 in stand 10 (Fig. 3) so that the stage is held in upper position without continuous pressure on the hand crank 41. Sufficient free space is thereby obtained beneath the stage 16, to easily demount the objective 13 from its clamping clips 14 by use of a finger tab 13' fixed to said objective, and to subsequently insert another objective therein. Then, the crank 41 is moved to its original position to lower the stage, but regardless of how abruptly this movement is accomplished, the stage will be properly cushioned in its fall by the dashpot 50. The dashpot therefor is inseparably combined in use with the above-described stage elevating means to produce a quick-acting elevating mechanism which is safe and sure in operation.

It often happens that it is necessary to raise the stage 16 a slight amount if the objectives are not parfocal or it may be necessary to bring some parts of a pitted or unevenly-finished specimen into best focus, and then to hold it in such focus. In such case, the hand crank 41 is turned very slightly to raise the stage until the desired features of the specimen come into focus, and the stage is locked in that place by turning the brake handle 48 to apply pressure through the brake shoe 43 to the crankshaft 34. Usually the amount of such focusing movement exceeds the range of the fine adjustment mechanism so that the hand crank functions independently of the fine adjustment as a focusing mechanism in this circumstance. It is readily apparent that the stage elevating mechanism operates in conjunction with and is dependent on the coordinated operation of the brake mechanism on the crankshaft to achieve the above described locking function.

Although but a single form of this invention is shown and described in detail, other forms are possible and changes may be made in the form and arrangement of the parts and substitutions may be made therein without departing from the spirit of this invention as defined in the claim herebelow.

I claim:

1. In a microscope for examination of an object by reflected light, the combination of a stand, an objective lens carried by the upper portion of the stand, a slide mounted for vertical movement on the stand, a stage carried by and projecting laterally from the slide for holding a specimen in operative position above the objective lens, fine adjustment mechanism carried by the lower portion of the stand, said mechanism including a lever pivotally carried by the stand and a rotatable screw for moving one end of the lever, the other end of the lever being engaged by a part on the lower end of the slide when the parts are in operative position whereby rotation of the screw will effect fine adjustments of the slide for bringing the object into focus of the objective, and means for raising and lowering the stage to permit the interchange of objective lenses, said means comprising a shaft mounted on the lower portion of the stand to turn about a horizontal axis, an arm having one end fixed to said shaft, the other end of the arm having a surface located below a lower edge of the slide whereby turning of the shaft will raise and lower the stage, and dashpot means for cushioning the downward movement of the slide to prevent injury to the fine adjustment mechanism when the part on the slide engages the lever, said dashpot means comprising a cylinder carried by the slide and a cooperating piston fixedly carried by the stand.

2. In a microscope for examination of an object by reflected light, the combination of a stand, an objective lens carried by the upper portion of the stand, a slide mounted for vertical movement on the stand, a stage carried by and projecting laterally from the slide for holding a specimen in operative position above the objective lens, fine adjustment mechanism carried by the lower portion of the stand and having a part in operative engagement with the lower edge of the slide for effecting fine adjustments of the slide for bringing the object into focus of the objective, and means for raising and lowering the stage to permit the interchange of objective lenses, said means comprising a shaft mounted on the lower portion of the stand to turn about a horizontal axis, an arm having one end fixed to said shaft, the other end of the arm having a surface located below a lower edge of the slide whereby turning of the shaft will raise and lower the stage, and dashpot means for cushioning the downward movement of the slide to prevent injury to the fine adjustment mechanism when the part on the slide engages the lever, said dashpot means comprising a cylinder carried by the slide and a cooperating piston fixedly carried by the stand.

References Cited in the file of this patent

UNITED STATES PATENTS

| Number | Name | Date |
|---|---|---|
| 1,082,160 | Kurowski | Dec. 23, 1913 |
| 1,987,776 | Hauser | Jan. 15, 1935 |
| 2,530,352 | Gallasch | Nov. 14, 1950 |

FOREIGN PATENTS

| Number | Country | Date |
|---|---|---|
| 546,693 | Germany | Mar. 16, 1932 |